United States Patent [19]

Hinson

[11] 4,134,630
[45] Jan. 16, 1979

[54] PROCESS FOR REPAIRING LEAD-IN WIRES OF ELECTRIC LIGHT BULBS

[75] Inventor: James E. Hinson, Phenix City, Ala.

[73] Assignee: Bulbex Corporation, Athens, Ga.

[21] Appl. No.: 909,197

[22] Filed: May 25, 1978

[51] Int. Cl.² ............................................. H01J 9/50
[52] U.S. Cl. ..................................... 316/2; 29/401 R
[58] Field of Search ............... 316/1, 2, 28; 29/401 R, 29/401 A, 401 D, 401 F

[56] References Cited

U.S. PATENT DOCUMENTS

| 467,982 | 2/1892 | Piffard | 339/144 |
|---|---|---|---|
| 659,687 | 10/1900 | Myers | 339/145 |
| 876,922 | 1/1908 | De Martino | 339/146 |
| 882,257 | 3/1908 | Merritt | 339/146 |
| 1,301,079 | 4/1919 | Van Keuren | 339/146 |
| 1,920,528 | 8/1933 | Butler | 316/2 |
| 2,047,023 | 7/1936 | Geiger et al. | 339/146 |
| 2,047,043 | 7/1936 | Strickland | 339/146 |
| 2,066,317 | 1/1937 | Blake et al. | 339/146 |
| 2,122,117 | 6/1938 | Stringer | 316/1 |
| 2,184,269 | 12/1939 | Brown et al. | 339/220 L |
| 2,336,529 | 12/1943 | Cartun | 339/146 |
| 2,403,137 | 7/1946 | Strickland | 339/146 |
| 2,504,586 | 4/1950 | Reinker | 339/146 |
| 2,700,143 | 1/1955 | Landgraf | 339/146 |
| 2,736,874 | 2/1956 | Bechard et al. | 339/146 |
| 3,775,634 | 11/1973 | Hasell et al. | 339/146 |
| 4,020,382 | 4/1977 | Bolt et al. | 339/146 |
| 4,029,387 | 6/1977 | Eager | 339/146 |
| 4,044,277 | 8/1977 | Komyati | 339/146 |

Primary Examiner—Richard B. Lazarus
Assistant Examiner—John McQuade
Attorney, Agent, or Firm—Phillips, Hart & Mozley

[57] ABSTRACT

A method of repairing lead-in wires of an electric light bulb, said bulb having a threaded base including a permanently secured insulative web, by removal of the insulative web on the base of the bulb, without removal of the base itself; repair of the inoperative lead-in wires; and replacement of the insulative web on the base of the bulb.

23 Claims, 9 Drawing Figures

PROCESS FOR REPAIRING LEAD-IN WIRES OF ELECTRIC LIGHT BULBS

BACKGROUND OF THE INVENTION

The present invention relates to the art of repairing an electric light bulb, said bulb having a threaded base including a permanently secured insulative web, in which the lead-in wires, which are carried in the base of the bulb and which connect the filaments of the lamp to the external power source or the ground, respectively, may be repaired when they are found to be inoperative after the overall bulb assembly is complete.

Lead-in wires may be inoperative for a variety of reasons. They may be inoperative because the lead-in wire is defective, because the electrical connections within the base are defective, or because the lead-in wires or the electrical connections within the base have deteriorated through use of the bulb.

In many instances, the remaining components of the electric light bulb continue to have substantial useful life, even though the lead-in wires have become inoperative and therefore the bulb as a whole is no longer functional. In such cases, the bulbs are generally discarded, despite the remaining operative parts of the electric light bulb.

SUMMARY OF THE INVENTION

The object of the present invention is to eliminate the need for wasting such otherwise operable electric light bulbs, and for providing a method for using the other components of the bulb to the full extent of their useful life by repairing the inoperative lead-in wires on the bulb.

A further object of the present invention is to provide a method for the repair of said lead-in wires without the need of removing the whole base unit of the bulb, which base unit includes the metallic shell cemented to the evacuated envelope of the bulb, the insulative web permanently secured to the base, and the external electrical contact cap, from the fragile evacuated glass envelope of the bulb which carries the filament.

Another object of the present invention is to provide a method for repairing the lead-in wires of the otherwise operative bulb without exposing the remaining operative parts of the bulb to the high temperatures required to mold insulative web from contemporary insulative materials which can only be molded at high temperatures.

A still further object of the present invention is to provide a relatively inexpensive method of repairing otherwise expensive light bulbs still having a substantial useful life.

The foregoing objects of the present invention, as well as other objects and advantages of the present invention, will become more apparent from the following detailed description of the invention, and from the attached drawings, in which the numbered parts shown in the drawings correspond to the numbered parts described in the detailed description of a preferred embodiment of the invention, and in which:

DETAILED DESCRIPTION OF A PREFERRED METHOD

As set forth below, the preferred method of repairing inoperable lead-in wires is described. However, it should be understood that the preferred method described below is merely one of many alternative methods by which the process which is the subject matter of the present invention may be performed. Therefore, the detailed description of the preferred method set forth below is intended merely to be exemplary of the present invention, and is not an exhaustive or exclusive description of all of the different variations and alternative methods by which the process of the present invention may be performed.

Figure 1:
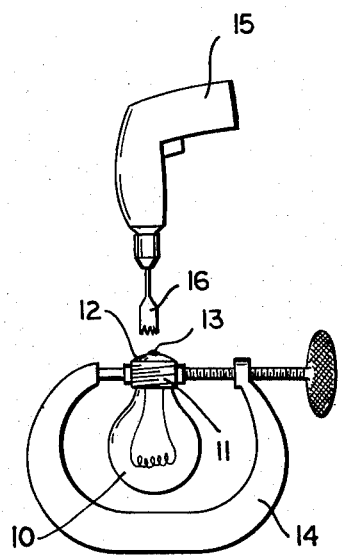
FIG. 1 is a side view of an electric light bulb which is to be the subject of the process of the present invention, and which is being prepared for the removal of the insulative web from the base of the bulb.

Referring now to FIG. 1, it is shown that the first step in the preferred method of repairing inoperable lead-in wires on an electric light bulb 10 includes the removal of the insulative web 12 from the base 11. As shown in FIG. 1, the removal of the insulative web is facilitated by the placement of the electric light bulb 10 in a vice grip 14 or other similar device for holding the electric light bulb 10 while the process is being performed.

One method of removing the insulative web 12 from the base 11 of the bulb 10 is the use of a standard drill 15, fitted with a reamer attachment 16. Inasmuch as the insulative web 12 is generally made of glass, procelain or plastic, and has been permanently secured to the base 11 by being molded "in situ" or by being preformed and then permanently secured to the base 11 mechanically or by being cemented, the insulative web 12 should be removed by applying standard drilling techniques to ream out the insulative web 12 of the base 11. In so doing, it is generally necessary and desirable to drill out the external electrical contact cap 13 connected to the inoperative lead-in wire as well.

Figure 2:
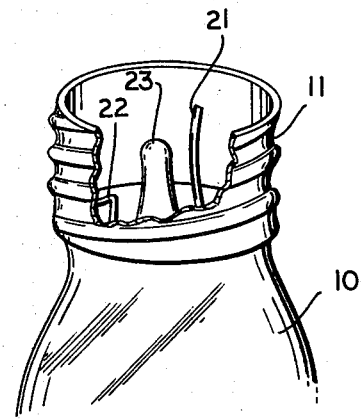
FIG. 2 is a pictorial view of said bulb after removal of the insulative web, a portion of which has been broken away to show the components carried within the base of the bulb.

Referring now to FIG. 2, the internal components of the bulb 10 carried in the base 11 are shown. These components include the lead-in wire 21 which is electrically connected to the filament inside the evacuated envelope of the bulb 10; a ground lead-in wire 22 which electrically connects the filament inside the evacuated bulb 10 to a grounded portion of the base 11; and a fuse device 23. As shown in FIG. 2, a frequent reason why the lead-in wires are inoperable is that they have deteriorated through use of the bulb and have broken. The lead-in wire 21 shown in FIG. 2 has a free end resulting from the breakage of the lead-in wire through use. The remaining portion of the lead-in wire electrically connected to the external electric contact cap 13 may have been removed incidentally in removing the insulative web 12 and external electric contact cap 13. However, in the event that the remaining portion of the lead-in wire has not been removed from the base 11, it will be necessary to remove the remaining portion of the lead-in wire from the base before proceeding further with the repair of the lead-in wire 21.

In other cases, the inoperable lead-in wire may merely be defective, and the process may require the removal of the defective portion of the lead-in wire. In such cases, the defective portion of the lead-in wire may be removed by clipping the lead-in wire off between the defective portion of the lead-in wire and the electrical connection of the lead-in wire to the filament of the evacuated envelope of the bulb 10. The defective portion of the lead-in wire my thereafter be replaced in accordance with the following steps of the process as set forth below.

Figure 3:
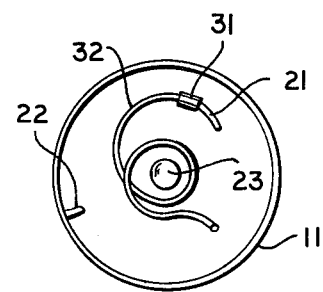
FIG. 3 is a top view of the components inside the base of the bulb after the insulative web has been removed and after a replacement length of lead-in wire has been installed.

Referring now to FIG. 3, it is shown that a length of replacement lead-in wire 32 is electrically connected to the lead-in wire 21 by means of an electrical connector 31. The purpose of providing the replacement lead-in wire 32 is to provide a sufficient length of lead-in wire for connection to the external electrical contact cap and therefore the source of electrical energy.

As shown in the top view of FIG. 3, the ground lead-in wire 22 will also be exposed. At this point in the process, it may be necessary to replace or reinforce the electrical connection between the ground wire 22 and the grounded portion of the base 11. Generally, this may be done by sautering the ground lead-in wire 22 to the grounded portion of the base 11.

Once the length of replacement lead-in wire 32 has been connected to the lead-in wire 21 by means of the electrical connector 31, the length of replacement lead-in wire 32 should be arranged within the base 11 of the bulb 10 so as not to come into contact with the ground lead-in wire 22. Additionally, it may be desirable to wrap the length of lead-in wire 32 about the fuse 23 in order to hold the length of replacement wire 32 in position away from the ground lead-in wire 22 and the sides of the base 11. Such winding may also be desirable in that it will permit the length of lead-in wire 32 to expand and contract as it is heated during the normal operation of the bulb.

Figure 4:
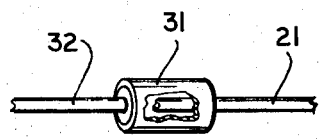
FIG. 4 is a pictorial view of one alternative embodiment of the replacement length of lead-in wire and electrical connector used in conjunction therewith, a portion of which has been broken away to show the connection between said connector and the lead-in wire.
Figure 5:
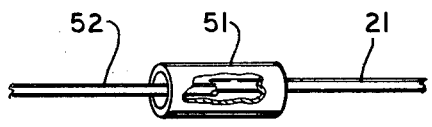
FIG. 5 is a pictorial view of a second alternative embodiment of a replacement wire and an electrical connector for use in conjunction therewith, a portion of which has been broken away to show the connection between the replacement wire and the lead-in wire.

Referring now to FIGS. 4 and 5, the means of providing an electrical connection between a length of replacement lead-in wire and the lead-in wire 21 are shown. In FIG. 4, it is shown that the means of electrically connecting the length of replacement lead-in wire 32, may be an integral connecting part 31 of the length of replacement lead-in wire 32. As shown in FIG. 4, the end portion 31 of the length of replacement wire 32 is hollow to facilitate the insertion of the lead-in wire 21 into the end portion 31 of the length of replacement lead-in wire 32. In this manner, the lead-in wire 21 may be electrically connected to the length of replacement lead-in wire 32. Such electrical connection may be maintained either by crimping the hollow end 31 of the length of replacement lead-in wire 32 or by soldering the electrical connection between the inner surface of the hollow end 31 of the length of replacement wire 32 to the lead-in wire 21.

An alternative means of providing an electrical connection between a length of replacement lead-in wire and the lead-in wire 21 is shown in FIG. 5. This alternative means of providing an electrical connection is shown in FIG. 5 as a sleeve device 51. The free end of the lead-in wire 21 is inserted into the sleeve 51, along with a free end of the length of replacement lead-in wire, this drawing denominated as a length of replacement lead-in wire 52, so as to provide an electrical connection therebetween. Again, this electrical connection may be maintained either by means of crimping the sleeve 51 about the ends of the lead-in wire 21 and the length of replacement lead-in wire 52, or by means of soldering the electrical connections between the internal surface of the sleeve 51 and the ends of the length of replacement lead-in wire 52 and lead-in wire 21, respectively.

The outer surfaces of the sleeve 51 and the hollow end 31 of the length of replacement wire 32 may be insulated. The advantages of insulating the outer surfaces of these means of providing electrical connection is that it avoids the likelihood of contact between the electrical connector means and the inner surface of the base 11 or the ground lead-in wire 22. Such additional protection may be particularly important in cases in which the sleeve 51 or the hollow end 31 are comparatively large with respect to the lead-in wire 21 and the lengths of replacement lead-in wire 52 and 32, respectively.

Figure 6:
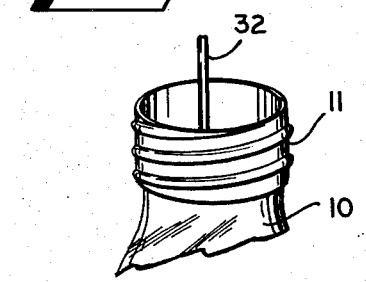
FIG. 6 is a perspective view of the base of the bulb as it is being prepared for the replacement of the insulative web.

As shown in FIG. 6, once the length of lead-in replacement wire 32 has been electrically connected to the lead-in wire 21, the length of replacement lead-in wire should be arranged to protrude axially from the base 11. This arrangement will facilitate the ultimate electrical connection of the length of replacement lead-in wire 32 to the external electrical contact cap 72 as will be described below.

Figure 7:
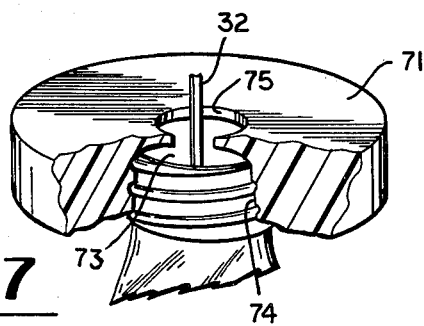
FIG. 7 is a pictorial view of the mold used in replacing the insulative web in which a portion of said mold has been broken away to show its inner surface and connection with the base of the bulb.

As shown in FIG. 7, the next step of the process is to provide an insulative web 81 in place of the portion of the insulative web 12 removed at the beginning of the process. The insulative web 81 is provided by molding a putty-like material over the exposed end portion of the base 11 and around the protruding length of replacement length of lead-in wire 32.

It has been found that the use of a putty-like material which does not require the application of heat to be formed and set, and which may be quickly molded is an advantageous method of providing an insulative web 81. One putty-like material which may be used to good advantage is the type of putty which is commonly used in repair of metallic surfaces such as automobile bodies. This putty material may be formed and set quickly without the application of heat and provides a strong insulative surface between the base 11 and the protruding length of replacement lead-in wire 32. One such putty-like product which is currently in commerce is sold by the TRW Company under the trademark BODY FILLER, and is a putty-like polyester resin composition which is comprised of benzoyl peroxide, butyl benzyl phthalate and a hardening agent generally made of benzoyl peroxide in phthalate ester.

The molding of the putty-like material is facilitated by the use of a mold 71 having a cavity 73 which may be placed over the base of the bulb 11. The mold should preferably be made from a non-metallic material, such as wood or plastic, which will not adhere as readily as metal to the putty-like material from which the insulative web 81 will be made. However, the mold may be covered with a coating of a synthetic resin polymer product sold under the trademark TEFLON, in which case any material capable of being coated with such a synthetic resin polymer product may be used for making the mold.

The cavity should be in the shape of desired external surface of the insulative web 81, and should have an opening 75 to permit the length of replacement lead-in wire 32 to protrude from the mold. The opening may also be sufficiently large to permit the introduction of the putty-like material into the mold through the opening, and also sufficiently large to affix an external electrical contact cap 72 to the surface of the putty through the opening after the cavity 73 and the mold 71 has been filled with putty-like material to form the surface of the insulative web 81. Preferably, the opening 75 in the mold should also be of sufficient depth to permit the putty material to be built up at the point where the external electrical contact cap 72 is to be placed so as to provide a slightly raised portion on the insulative cap 81 beneath the external electrical contact cap 72 which will facilitate a better electrical contact between the external electrical contact cap 72 and the base of any lamp in which the bulb may be used.

The placement of the mold 71 over the base 11 may be facilitated by providing an additional threaded inner surface 74 extending vertically from the cavity 73. The mold may therefore be more reliably placed in position over the base 11 of the bulb 10 and held in that position during the molding operation.

Once the mold 71 is in position over the base 11 of the bulb 10, the putty-like material should be introduced into the mold through an opening, such as the opening 75 shown in FIG. 7. The putty-like materials should be introduced into the mold until the putty-like material provides an insulative web 81 completely covering the exposed end portion of the base 11. Once the insulative web surface 81 has been formed by introducing the putty-like materials into the cavity 73 of the mold 71, the putty-like material should be built up into the opening 75 in the mold 71 to provide a raised portion of the insulative web about the length of replacement lead-in wire 32 on which to imbed an external electrical contact cap 72. The external electrical contact cap 72 should be imbedded upon the putty-like material built up into the opening 75 of the mold 71 immediately after the putty-like material has been introduced into the mold and before the putty-like material has set. As imbedded in the insulative web 81, the external electrical contact cap 72 will be adjacent, or, as shown in FIG. 7, may actually imbedded around the length of replacement lead-in wire 32.

The external electrical contact cap 72 may be made of copper or any other conductive metal, and may be of standard construction.

Once the putty-like material has set in the mold 71, the mold should be immediately removed from the base 11 of the bulb 10. The importance of immediately removing the mold 71 after the putty-like material has set is that it is undesirable to permit a bond to form between any of the putty-like material and the mold itself. In the event that such a bond forms between the mold and the putty-like material, it may be impossible to remove the mold without damaging the bulb 10, particularly by breaking the base 11 free from the bulb 10. It has been found that the risk of such breakage may be lessened by coating the cavity 73 with a wax or oil to keep the putty-like material from forming a bond with the mold. Alternatively, the mold may be coated with a polyester resin coating, such as that sold under the trademark TEFLON, to prevent such bonding.

Figure 8:
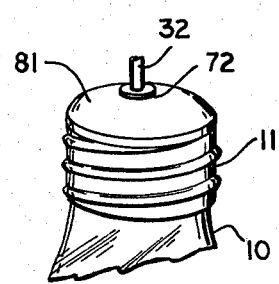
FIG. 8 is a perspective view of the base of the bulb after the insulative web has been replaced and a replacement external electrical contact cap has been provided.
Figure 9:
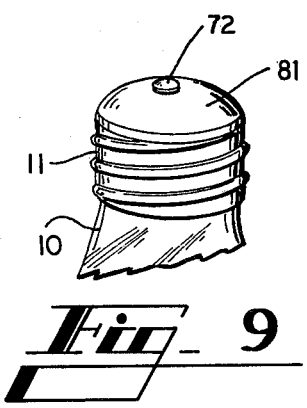
FIG. 9 is a perspective view of the repaired base of the electric light bulb.

As shown in FIG. 8, once the mold 71 has been removed from the base 11 of the bulb 10, the length of replacement lead-in wire 32 will protrude vertically from the insulative web 81 adjacent to the external electrical contact cap 72. A good electrical connection should be insured between the length of replacement lead-in wire 32 and the external electrical contact cap 72 by soldering the length of replacement lead-in wire 32 to the external electrical cap 72. Once a good electrical connection has been provided between the length of replacement lead-in wire 32 and the external electrical contact cap 72, any additional lengths of replacement lead-in wire 32 should be removed from the bulb 10 to provide a smooth point of electrical connection between the bulb and the socket at the external electrical cap 72, such as the external electrical contact cap 72 shown in FIG. 9.

As can be seen from the foregoing description of a preferred method of performing the process of the present invention, such a process may be performed many times over the useful life of an electrical light bulb. Therefore, it may be desirable to introduce a fire-proof material, such as asbestos, into the inner surface of the base 11 after the length of replacement lead-in wire 32 has been electrically connected to the lead-in wire 23, but before the mold 71 is placed over the end of the base 11. Ths asbestos will prevent damage to the useful, components within the base 11 of the bulb 10 should any of the electrical components within the base 11 short out.

The preferred method of performing the process of the present invention set forth above has been merely illustrative and exemplary in purpose. It will be understood that there are many variations on the steps described above which may be made without departing from the scope and spirit of the process of the present invention. Therefore, it will be expressly understood that the foregoing description of a preferred method of performing the process of the present invention is not intended in any way to limit the present invention to the steps detailed above, and that the present invention shall be limited solely by reference to the appended claims below.

I claim:

1. A process for the repair of an inoperative first lead-in wire of a light bulb, said bulb having a base for electrically connecting said bulb to a source of electrical energy, and said base containing said first lead-in wire and having a permanently secured insulative web carrying an external electrical contact cap for electrically connecting said first lead-in wire to said source of electrical energy, comprising the following steps:

the step of removing a sufficient portion of said permanently secured insulative web from said base to permit external access to said inoperative first lead-in wire without removing said base from said bulb;

the step of repairing said inoperative first lead-in wire to provide a repaired first lead-in wire; and the step of providing an insulative web in place of said removed portion of insulative web.

2. A process as set forth in claim 1 which further includes the step of removing said external electrical contact cap before the step of providing an insulative web in place of said removed portion of insulative web; and the step of thereafter providing an external electrical contact cap for said repaired first lead-in wire.

3. A process as set forth in claim 1 wherein said step of removing a sufficient portion of said permanently secured insulative web from said base to permit external access to said inoperative first lead-in wire includes the removal of said permanently secured insulative web by drilling out said permanently secured insulative web.

4. A process as set forth in claim 1 wherein the step of repairing said inoperative lead-in wire includes the step of removing a first length of said inoperative first lead-in wire and leaving a remaining length of said first lead-in wire remaining, said remaining length of lead-in wire having a first free end and having a second end in electrical connection with said bulb; and the step of replacing said first length of said inoperative lead-in wire with a length of replacement lead-in wire to provide a repaired first lead-in wire.

5. A process as set forth in claim 4 wherein the step of replacing a first length of said inoperative first lead-in wire with a length of replacement lead-in wire includes electrically connecting said replacement lead-in wire to said remaining length of said first lead-in wire by electrically connecting said remaining length of said first lead-in wire to a common electrical connector device and electrically connecting said replacement lead-in wire to said common electrical connector device.

6. A process as set forth in claim 5 wherein said common electrical connector device includes a sleeve having a conductive inner surface; and wherein the step of electrically connecting said replacement lead-in wire to said remaining length of said first lead-in wire includes the steps of electrically connecting a first end of said replacement lead-in wire to said conductive inner surface of said sleeve, and of electrically connecting the free end of said remaining length of said first lead-in wire to said inner surface of said sleeve.

7. A process as set forth in claim 6 wherein the step of electrically connecting said first end of said replacement lead-in wire to said conductive inner surface of said sleeve includes crimping said sleeve about said first end of said replacement lead-in wire.

8. A process as set forth in claim 6 wherein said step of electrically connecting said free end of said remaining length of said first lead-in wire to said conductive inner surface of said sleeve includes crimping said sleeve about said free end of said remaining length of said first lead-in wire.

9. A process as set forth in claim 6 wherein said step of electrically connecting said first end of said replacement lead-in wire to said conductive inner surface of said sleeve includes soldering said first end of said replacement lead-in wire to said sleeve.

10. A process as set forth in claim 6 wherein said step of electrically connecting said free end of said length of remaining length of said first lead-in wire to said conductive inner surface of said sleeve includes soldering said free end of said remaining length of said first lead-in wire to said conductive inner surface of said sleeve.

11. A process as set forth in claim 6 wherein said sleeve has an insulative outer surface.

12. A process as set forth in claim 4 wherein said length of replacement lead-in wire includes a hollow first end wherein said step of replacing a first length of said defective first lead-in wire with a length of replacement lead-in wire includes the step of inserting said free end of said remaining length of said first lead-in wire into said hollow first end of said length of replacement wire, and the step of providing an electrical connection there between.

13. A process as set forth in claim 12 wherein said step of providing an electrical connection between said free end of said remaining length of first lead-in wire and said first hollow end of said length of replacement wire includes crimping said first hollow end of said replacement wire about said free end of said remaining length of said first lead-in wire.

14. A process as set forth in claim 12 wherein said step of providing an electrical connection between said free end of said remaining length of said first lead-in wire and said first hollow end of said length of replacement wire includes soldering said free end of said remaining length of said first lead-in wire to said first hollow end of said length of replacement wire.

15. A process for the repair of an inoperative first lead-in wire of a light bulb, said bulb having a base for electrically connecting said bulb to a source of electrical energy, and said base containing said first lead-in wire and having a permanently secured insulative web carrying an external electrical contact cap for electrically connecting said first lead-in wire to said source of electrical energy, comprising the following steps:
the step of removing a sufficient portion of said permanently secured insulative web from said base to permit external access to said inoperative first lead-in wire without removing said base from said bulb;
the step of repairing said inoperative first lead-in wire to provide a repaired first lead-in wire; and
the step of molding an insulative web in place of said removed portion of said insulative web.

16. A process as set forth in claim 15 wherein said step of molding an insulative web in place of said removed portion of insulative web includes forming a putty material capable of being formed and set without the application of heat into the shape of an insulative web and permitting said putty to set in order to provide an insulative web.

17. A process as set forth in claim 16 wherein said step of forming said putty material includes the steps of placing a mold about the periphery of said base; introducing said putty material into said mold; and removing said mold after permitting said putty to set.

18. A process as set forth in claim 15 which further includes the step of removing said external electrical contact cap before the step of molding an insulative web in place of said removed portion of insulative web thereby providing an unbound end of said first lead-in wire; and the step of thereafter providing an external electrical contact cap for said unbound end of said repaired first lead-in wire.

19. A process as set forth in claim 18 wherein said step of molding an insulative web in place of said removed portion of insulative web include forming a putty material capable of being formed and set without the application of heat into the shape of an insulative web; arranging said unbound end of said repaired first lead-in wire to protrude through said formed putty material; and providing an external electrical contact cap for said repaired first lead-in wire by electrically connecting said unbound end of said repaired first lead-in wire to said external electrical contact cap.

20. A process as set forth in claim 19 wherein said step of forming said putty material includes the steps of placing a mold about the periphery of said base, said mold having an opening to permit said unbound end of said repaired first lead-in wire to protrude through said mold; arranging said unbound end of said repaired first lead-in wire to protrude through said opening in said mold; introducing said putty material into said mold; and removing said mold after permitting said putty to set.

21. A process as set forth in claim 20 wherein the step of providing said external electrical contact cap for said repaired first lead-in wire includes the step of imbedding said external electrical contact cap in said putty material before permitting said putty material to set.

22. A process as set forth in claim 21 wherein said step of imbedding said electrical contact cap in said putty material includes imbedding said electrical contact cap in said putty material through said opening in said mold through which said first lead-in wire protrudes.

23. A process for the repair of an inoperative first lead-in wire of a light bulb, said bulb having a threaded base for electrically connecting said bulb to a source of electrical energy, and said base containing said first lead-in wire and having a permanently secured insulative web carrying an external electrical contact cap for electrically connecting said first lead-in wire to said source of electrical energy, comprising the following steps:

the step of removing said external electrical contact cap from said permanently secured insulative web and from said inoperative first lead-in wire;

the step of drilling out a sufficient portion of said permanently secured insulative web from said threaded base to permit external access to said inoperative first lead-in wire without removing said threaded base from said bulb;

the step of removing a first length of said inoperative first lead-in wire leaving a remaining length of said first lead-in wire having a first free end and a second end remaining in electrical connection with said bulb;

the step of replacing said first length of said inoperative first lead-in wire with a length of replacement lead-in wire, said length of replacement lead-in wire having a hollow first end and an unbound second end ;

the step of inserting said free end of said remaining length of said first lead-in wire into said hollow end of said length of replacement lead-in wire, and the step of providing an electrical connection there between;

the step of placing a mold about the threaded periphery of said theraded base, said mold having a threaded inner circumferential surface for receiving said threaded base, an opening to permit said unbound second end of said replacement lead-in wire to protrude through said mold; the step of arranging said unbound second end of said replacement lead-in wire to protrude through said opening in said mold;

the step of threading said mold onto said base to hold said mold in place;

the step of introducing putty material capable of being formed and set without the application of heat into said mold to provide an insulative web in place of said removed portion of insulative web;

the step of affixing an external electrical contact cap to the external surface of said putty material by imbedding said external electrical contact cap into said putty material through said opening in said mold;

the step of permitting said putty material to set; the step of removing said mold by unthreading said mold from said base; and the step of providing an electrical connection between said protruding unbound second end of said length of replacement lead-in wire and said imbedded external electrical contact cap.

* * * * *